July 6, 1965

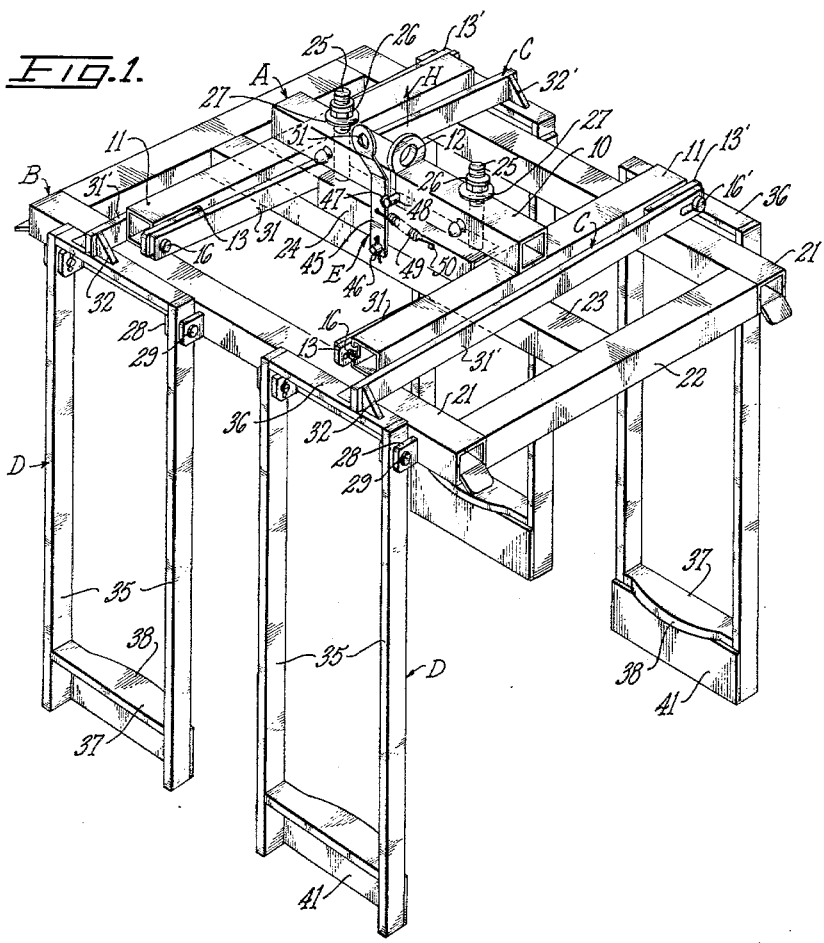
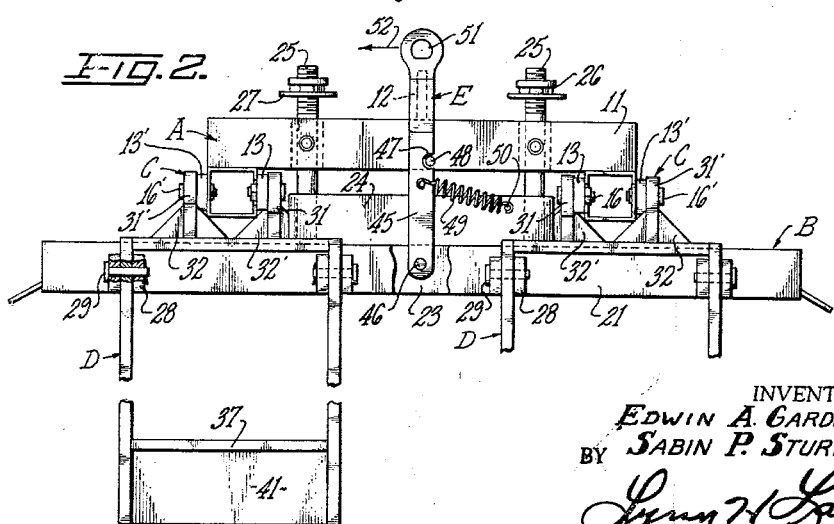

E. A. GARDNER ET AL 3,193,320

METHOD AND APPARATUS FOR HANDLING BOXES OF FRUIT
IN AN ORCHARD FOLLOWING PICKING

Filed Aug. 13, 1962

INVENTORS
EDWIN A. GARDNER
BY SABIN P. STURTEVANT

*Lynn H. Latta*
ATTORNEY

United States Patent Office 3,193,320
Patented July 6, 1965

3,193,320
METHOD AND APPARATUS FOR HANDLING BOXES OF FRUIT IN AN ORCHARD FOLLOWING PICKING
Edwin A. Gardner, Ventura, and Sabin P. Sturtevant, Van Nuys, Calif., assignors to Esengee Company, Santa Paula, Calif., a corporation of California
Filed Aug. 13, 1962, Ser. No. 216,679
6 Claims. (Cl. 294—110)

This invention relates to the handling of fruit in an orchard following the picking of the fruit. More specifically, the invention deals with apparatus for handling the boxes in which the fruit is collected following picking, its general object being to provide an improved hoist-operated grapple unit for transferring a stack of filled boxes from the ground into a truck.

The principal object of the invention is to provide a grapple having jaws which are energized automatically by gravity and load for grasping and releasing a tier of boxes in response to hoisting and lowering movements respectively, and embodying latch means operable to oppose the automatic gravity response in a manner to hold the jaws in spread relation for maneuvering the grapple into load-engaging position and for releasing the load after it has been moved.

The invention may be embodied either in a double grapple unit adapted to engage simultaneously two stacks or tiers of filled fruit boxes stacked side-by-side and to deposit them in a truck with the same side-by-side relationship maintained; or in a single unit for handling one tier.

Other objects and advantages will become apparent in the ensuing specification and appended drawing in which:

FIG. 1 is a perspective view of a box-loader grapple apparatus embodying the invention;

FIG. 2 is a fragmentary side elevational view of the same;

*General description*

Figure 3:
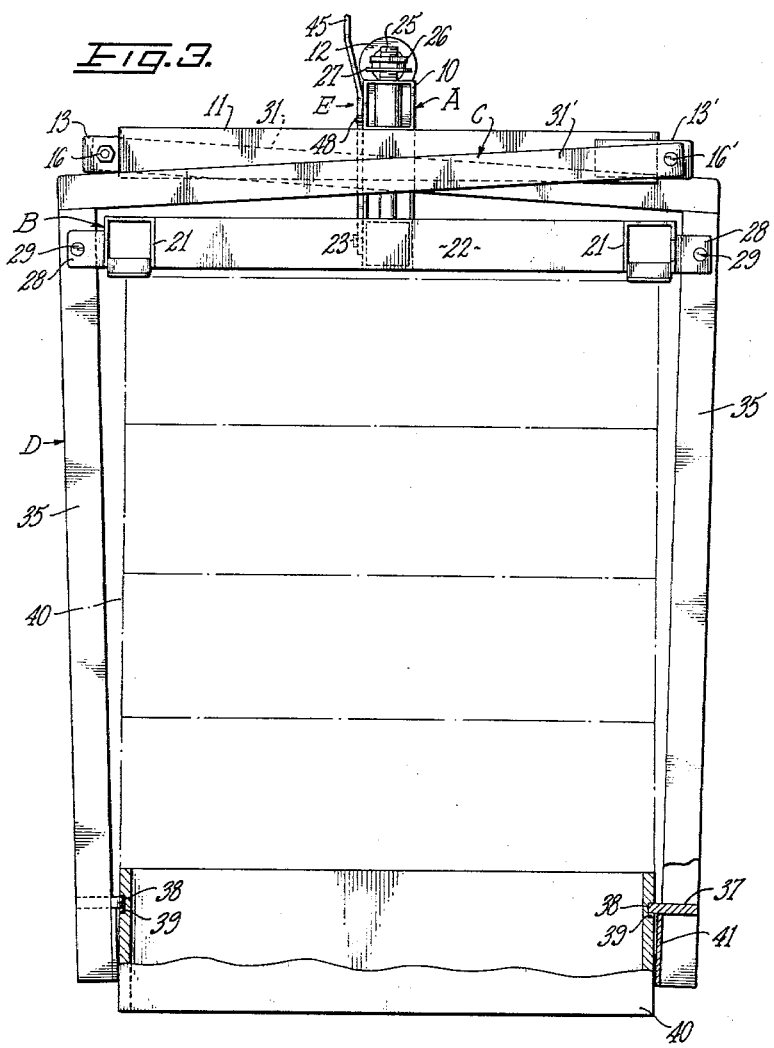
FIG. 3 is a front elevational view of the same illustrating the engagement of the grapple jaws against the lowermost box of a tier of boxes.

Referring now to the drawings in detail, and in particular to FIG. 1 thereof, we have shown therein, as an example of one form in which the invention may be embodied, a fruit box hoist apparatus comprising, in general, a suspension head A consisting principally of an H-frame; a rectangular floating fulcrum frame B disposed immediately below the suspension head A; two sets of lazy-tong linkages C operating as respective suspension connections between the head A and fulcrum frame B; two pairs of opposed grapple jaws D hinged to the suspension frame B and connected to the respective linkages C for actuation thereby in response to the application of lift to the suspension head A, and to the relaxation of the lifting force respectively; and a latch unit E for holding the jaws D in open positions.

Briefly reviewing the operation of the apparatus in advance of the detailed description hereinafter, the suspension head A is adapted to be suspended from a conventional hoist (indicated schematically by arrow H) carried by a fruit box transport truck, and preferably from a travelling crane type of hoist mounted for travelling movement parallel to the longitudinal axis of the truck, on a suitable rail supported above the truck body and projecting rearwardly beyond the rear end of such body, whereby the hoist can be operated to grasp and lift one or more boxes resting on the ground behind the truck, can then be elevated to a height clearing the truck body and thence transported by travelling of the hoist unit along the overhead rail to a position above the truck body, from which position the boxes may be lowered to rest upon the bed of the truck body. Such travelling hoist mechanisms are already known and in use in the art and in themselves form no part of the present invention. Hence, they have not been illustrated herein.

More specifically, the invention contemplates the use of our improved grapple mechanism with a travelling crane hoist in which the hoist unit (having a self contained hoisting mechanism) is mounted for travelling movement on a U-shaped rail having respective parallel arms thereof disposed over the truck body and in spaced relation to opposite sides of the longitudinal axis of the truck body, the two rail arms being connected at their rear end by a semicircular connecting rail on which the hoist unit may travel to a selected position on either side of the truck body so as to deposit its stack of boxes on one side or the other of the truck body.

Using such a travelling hoist, lift is applied to the suspension head A at the center thereof so that the load may be distributed equally on all sides of the lifting axis. The lift is transferred from the lifting head A through the linkages C to the fulcrum head B. The linkages C are rigidly connected to the respective grapple jaws D in a manner such that the lifting force swings the jaws D toward one another about their fulcrum axes on which they are hinged to the fulcrum frame B. Thus the lift may be made effective to swing the jaws into grappling engagement with the ends of respective boxes disposed as the lowermost boxes of respective vertical tiers of boxes piled one upon another. Two tiers of boxes thus can be simultaneously grasped and lifted without disturbing their relative arrangement, and thence can be transported by the travelling lift to a selected position over the truck body and lowered to rest upon the bottom of the truck. When the lift is fully retracted, the forces of gravity developed in the suspension head A, acting through the linkages C will separate the jaws E from engagement with their respective boxes. Latch mechanism E then becomes automatically operable to latch the jaws in their separated condition so that the grapple unit can be hoisted without reengaging the stacks of boxes, and returned to the loading point for another load.

*Detailed description*

Figure 4:
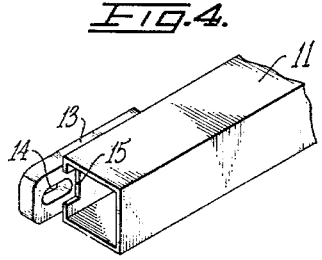
FIG. 4 is a fragmentary perspective view of a portion of the suspension head of the apparatus.

Suspension head A comprises a connector bar 10 secured to the centers of a pair of cross arms 11 therebeneath. As shown, the bars 10 and 11 may be of steel tubing of square cross section. The underfaces of the respective end portions of connector bar 10 are welded to the upper faces of cross arms 11. Thus connected, the assembled bars provide an H-frame. To the center of this frame is secured a suspension eye 12 which is suitably inset and welded into the center of connector bar 10. To the inner vertical faces of the respective cross-arms 11 at one side of head A (FIG. 4) are secured, as by welding, respective hinge fittings 13 having respective elongated hinge slots 14. The inner vertical walls of arms 11 may be notched at 15 to accommodate the hinge pivots 16 (e.g., bolts—FIG. 3) by means of which the linkages C are pivotally connected to the suspension frame A.

At the other side of the suspension head A, corresponding hinge fittings 13' are secured to the outer faces of the respective arms 11, but are otherwise of the same construction as fittings 13.

Fulcrum frame B is of rectangular closed frame form, comprising respective side bars 21, end bars 22, and a median bar 23 secured at its ends to end bars 22 at the centers thereof. The joints between bars 21, 22 and 23 may be developed by welding.

A pedestal block 24, having a length less than the space between the opposed linkages C, is secured to the upper face of the median bar 23 and is receivable between the linkages C when the jaws D are in their opened positions. Pedestal block 24 provides a base and a bracing support for a pair of guide pins 25 which are secured to or in the respective ends thereof and project upwardly through parallel vertical bores in the connecting bar 10 of suspension head A, the bores being suitably spaced so that the connecting bar 10 may have free vertical sliding movement on the guide pins 25. The guide pins 25 maintain proper orientation between the suspension frame A and the fulcrum frame B during relative vertical movements of the two frames with respect to one another.

Guide pins 25 have threaded upper ends on which are threaded respective adjustment nuts 26 having abutment flanges 27 for limiting upward movement of suspension head A with respect to the fulcrum frame B.

Linkages C each comprise (FIG. 3) a pair of inward lever arms 31 and a pair of outward lever arms 31'.

Secured, as by welding, to the outer side faces of respective side bars 21 of fulcrum frame B are respective pairs of clevis lugs 28, provided with registering apertures in which are mounted respective hinge pins (e.g. bolts) 29 for hingedly connecting the jaws D to the fulcrum frame B.

At one side of the suspension head A, linkage arms 31 are connected to fittings 13 by pivot bolts 16, and are disposed between the arms 11. At the opposite side of the frame A, the linkage levers 31' are connected to fittings 13' by pivot bolts 16' and are disposed in outwardly embracing relation to the respective arms 11. At their opposite ends, the levers 31 are rigidly connected to respective jaws D at the one side of the frame B, and at their opposite ends, the levers 31' are rigidly connected to the jaws D at the other side of the frame. These rigid connections, at the one side of the frame, are indicated at 32' and at other side, at 32. As better seen in FIG. 2, connections 32, 32' comprise pairs of triangular gussets welded to respective sides of respective lever ends and welded to the respective jaws D.

Grapple jaws D comprise respective pairs of depending parallel arms 35 rigidly connected at their upper ends by bridge bars 26. Just below the bridge bar 36, each jaw D has a pair of aligned apertures through which the respective hinge bolts 29 are extended to provide a hinged connection between the respective jaw and the respective side bar of frame B, on an axis parallel to the respective side bar. At its lower end, each jaw D has a tooth 37 bridging transversely between its respective arms 35 and secured thereto as by welding. Each tooth 37 has a crowned central portion 38 for engagement in a handhold recess 39 at a respective end of a fruit box 40. To protect the end of the box against crushing, each jaw D has an apron 41 consisting of a flat plate secured to respective inner side margins of respective arms 35 and bridging therebetween for broad bearing engagement with the respective ends of the box 40. The gussets 32 are rigidly attached to the upper faces of the respective bridge bars 36 at the upper ends of respective jaws B. Thus, in operation, the respective linkage levers 31, 31' and their respective jaws D function as bell crank levers, upward movement of respective linkage levers 31, 31' resulting in inward swinging movements of the lower ends of the respective jaws D to effect closing movement against respective ends of a box.

For the jaws 37 to engage in the hand-hold recesses 39 of a respective box positioned on the ground surface, it is only necessary to lower the grapple with the jaws in spread relation and embracing respective tiers of boxes, to positions wherein their jaws are in registering relation to the respective hand-hold recesses 37, and to then effect a closing action which will automatically bring the jaws into coupling engagement with the recesses 37.

Latch unit E comprises a latch lever 45 linked by a pivot 46 at its lower end to the median bar 23 of frame B and projecting upwardly alongside the connector bar 10 of suspension head A. In its one side, the latch lever 45 has a notch 47 for coupling reception of a latch pin 48 secured in the connector bar 10. A coil spring 48 is linked to the lever and extends from that side, under tension, to a pin 49 mounted in pedestal block 24, to which it is anchored.

In the relative positions between suspension head A and fulcrum frame B in which the lever 45 is latched to the connector bar 10, the jaws D will be spread apart to receive or release a stack of boxes 40. Thus the fulcrum frame B is latched to the suspension head A in a manner preventing any relative vertical movement between the two frames. Accordingly, it is possible to raise and lower the grapple unit while maintaining the jaws in the spread condition, the latching connection being securely maintained by the spring 48.

In the upper end of lever 45 is an eye 51 to which an actuator cable can be attached, to extend in the direction indicated by arrow 52 designating the cable. By pulling on this cable it becomes possible to release the latching connection, and if a lift is then applied to the unit, the suspension head A will be raised until the latching pin 48 is out of registry with the notch 47, whereupon the pin 48 will engage the side of lever 45 to permit the tension in the actuator cable 52 to be relaxed without causing relatching to occur so long as the unit is in a suspended condition.

*Operation*

In operation of the unit, it is manipulated to bring the latching pin 48 into engagement in the notch 47. This may be effected simply by lowering the unit to rest against the ground, and permitting the suspension head A to settle by gravity to the position shown in FIG. 2 wherein the latching pin 48 registers with notch 47, whereupon spring 49 will pull the lever 45 into latching engagement with the pin. The grapple unit can then be elevated by means of its supporting hoist, and maneuvered to a position over a pair of tiers of boxes 40, then lowered over the two tiers while guiding the jaws D into the positions where their engaging teeth 37 will register with the recesses 39 of the boxes.

The operator then exerts a pull against cable 52, releasing the latch 45 from the latch pin 48 and permitting the fulcrum frame B to settle downwardly while the suspension frame A remains suspended at a fixed elevation. The downward movement of frame B will cause the linkage levers 31, 31' to tilt downwardly about their respective hinge pivots 16, 16', thus swinging the jaws D inwardly about their hinge pivots 29 and causing the teeth 37 to engage in the hand-hold recesses 39. The hoist is then operated to apply a lift to the suspension head A, raising the tiers of boxes each of which will be supported by the lowermost box which is engaged by a respective pair of jaws D. The weight of the loaded boxes applied to the linkage C will increase the grip of the jaws D against the boxes so that they can be lifted and held securely in the grasp of the grapple unit and thence elevated to a height above the truck body, transported horizontally to a selected position over the floor of the truck body, and thence lowered onto the floor. The lowering of the suspension head A is continued beyond that point where the tiers of boxes come to rest upon the truck body floor, whereupon the fulcrum frame B will become supported upon the jaws D while they are still engaged with the lower boxes. The lowering of suspension head A is continued beyond this point, whereupon the weight of the head A will be imposed downwardly against the linkage C, swinging the levers 31, 31' thereof upwardly toward horizontal positions and correspondingly swinging the jaws D apart to release the boxes 40. When full release has been obtained, the downwardly moving latch pin 48 will register with notch 47 of lever 45 and the spring 49 will then draw the lever into latching engagement with the pin 48, latching the jaws D in their open positions. Lift can then again be applied to the suspension head A, lifting the grapple unit with the jaws D remaining locked in their open positions, thus leaving the tiers of boxes resting on the truck bed while the grapple is returned for a new load.

While we have shown and described a double unit hoist (one having dual pairs of jaws for handling two tiers of fruit boxes) it will be understood that the invention can equally as well be embodied in a single unit embodying a single pair of opposed jaws, with a corresponding reduction in dimensions of the fulcrum frame B and suspension frame A, and with a relocation of the centers of these frames to coincide with the central vertical axis of the single pair of jaws (e.g., with parts 10, 25, 45, 46, E symmetrically disposed with reference to the center of a single cross bar 11).

We claim:

1. Apparatus for simultaneously handling a tier of boxes stacked one upon another, comprising: a suspension head having means for attachment thereof to a hoist; a fulcrum frame disposed beneath said suspension head; lazy-tong linkage between said fulcrum frame and said suspension head so as to be suspended therefrom; and a pair of grapple arms hinged at their upper ends to said fulcrum frame on parallel horizontal axes, extending downwardly therefrom, and having at their lower ends respective jaws for grappling engagement with respective ends of the lowermost box of said tier, unobstructed space being provided between said arms and beneath said fulcrum frame, to receive the remaining boxes of said tier, said arms being connected to said linkage at their upper ends so as to be swung toward one another by said linkage in response to vertical separation between said fulcrum frame and said suspension head resulting from application of hoisting movement to said suspension head, each of said jaws comprising a tooth of bar form secured to a respective grapple arm, extending transversely in a substantially horizontal plane and having an inwardly projecting portion receivable in a handhold recess in a respective end of a box, and an apron projecting downwardly from the respective tooth in a substantially vertical plane behind said inwardly projecting portion in a position for face-to-face engagement with a respective end of a box when said projecting portion is engaged in a respective hand-hold recess; and holding means for holding said jaws in spread positions without subjecting said linkage to a load while the fulcrum frame is suspended from said suspension head, whereby said apparatus may be maneuvered toward and away from position for engagement of said lowermost box without interference between said jaws and said tier, said holding means being releasable so as to permit said jaws to swing into box-engaging position.

2. Apparatus for simultaneously handling a tier of boxes stacked one upon another, comprising: a suspension head comprising an H-frame having a central connector bar and a pair of parallel cross arms carried thereby, said connector bar bridging transversely between and above said cross arms for attachment thereof to a hoist; a fulcrum frame disposed beneath said suspension head and including laterally spaced parallel side bars, a median bar disposed between and parallel to said side bars, and parallel end bars secured to and bridging between said side bars and attached at their respective midpoints to respective ends of said median bar; a pair of grapple jaws hinged at their upper ends to said bars on axes parallel thereto, said jaws including respective arms projecting downwardly from said hinge axes and box-engaging teeth carried by the lower ends of said jaws and disposed in opposed relation to one another for grappling engagement with respective ends of the lowermost box of said tier, space being provided between said jaw arms and beneath said fulcrum frame, to receive the remaining boxes of said tier; and linkage comprising a pair of lever arms each pivoted at one end to a respective end of a respective cross arm at one side of said suspension frame and extending, in crossed relation to the other lever arm, the full width of said suspension frame to the other side thereof, with its other end disposed adjacent said other side of said suspension frame and fixedly connected to the upper end of a respective jaw so as to define therewith a bell-crank operable to swing said respective jaw inwardly toward the other jaw in response to vertical separation between said fulcrum frame and said suspension head resulting from application of hoisting movement to said suspension head and latching means operable between the center of said H-frame and the center of said fulcrum frame for latching said frames against separation so as to hold said jaws in spread positions so that said apparatus may be maneuvered into position for engagement of the lower box of a tier of boxes without interference between said grapple jaws and said tier.

3. Apparatus for simultaneously handling a tier of boxes stacked one upon another, comprising: a suspension head having means for attachment thereof to a hoist; a fulcrum frame disposed beneath said suspension head and including laterally spaced parallel side bars; a pair of grapple jaws hinged at their upper ends to said bars on axes parallel thereto, said jaws including respective arms projecting downwardly from said hinge axes and box-engaging teeth carried by the lower ends of said jaws and disposed in opposed relation to one another for grappling engagement with respective ends of the lowermost box of said tier, space being provided between said arms and beneath said fulcrum frame, to receive the remaining boxes of said tier; linkage comprising a pair of lever arms each pivoted at one end to a respective side of said suspension frame and extending, in crossed relation to the other lever arm, to the other side thereof, with its other end disposed adjacent said other side and connected, in rigidly fixed relation, to the upper end of a respective jaw so as to swing said respective jaw inwardly toward the other jaw in response to vertical separation between said fulcrum frame and said suspension head resulting from application of hoisting movement to said suspension head; and latch means comprising a latch lever having one end pivotally connected to said fulcrum frame near the center thereof and projecting upwardly, a latch projection mounted in said suspension head, projecting laterally therefrom, and engageable by said latch lever for preventing separation between said suspension head and said fulcrum frame, by holding said jaws in separated positions for maneuvering them around a tier of boxes and spring means yieldingly biasing said latch lever into latching engagement with said projection, the upper end of said latch lever being manually operable to release said latching engagement.

4. Apparatus for simultaneously handling a tier of boxes stacked one upon another, comprising: a suspension head comprising a frame of H-shape including a central connector bar and a pair of cross arms secured to respective ends thereof; a fulcrum frame disposed beneath said suspension frame, said fulcrum frame including spaced parallel side bars, two parallel end bars joining the ends of said side bars, and a median bar; two pairs of jaws each comprising spaced vertical arms hinged at their upper ends to a respective side bar on a hinge axis parallel thereto, a bridge connecting the upper ends of said jaw arms, and a box-engaging tooth connecting the said jaw arms near their lower ends, the teeth of the respective jaw pairs being in an opposed relation to one another for grappling engagement with opposite ends of the lowermost box of a respective tier, an unobstructed space being provided between said jaws and beneath said fulcrum frame to receive the remaining boxes of said tier; lazy-tong linkage suspending said fulcrum frame from said suspension frame, said linkage comprising a pair of lever arms each having a respective end pivoted to one end of a respective cross arm of said suspension frame, extending along one side thereof in approximately parallel relation thereto and having an opposite end secured in rigidly fixed relation to the bridge of a respective jaw, the respective lever arms being pivoted to opposite ends of the respective cross arm and located adjacent opposite sides thereof; and latch means comprising a latch lever pivoted to the center of one of said frames and extending generally vertically adjacent the center of the other frame, a latch projection carried by said center of the other frame and engageable with said latch lever to prevent vertical separation of the frames while suspended by said hoist, whereby to hold said jaws in spread relation to one another to permit them to be manipulated around said tiers of boxes; and spring means yieldingly biasing said latch lever into latching engagement with said projection.

5. Apparatus as defined in claim 2, wherein the lever arms of each pair of grapple jaws are arranged on opposite sides of a respective cross arm of said H-frame and are positioned at least partially in the horizontal plane of said cross arms when the jaws are in the open positions; and wherein said connector bar is secured to the upper sides of said cross arms and positioned above said plane.

6. Apparatus as defined in claim 4, wherein said latch lever is pivoted at its lower end to said median bar of the fulcrum frame and projects upwardly past one side of said connector bar of the H-frame and above the same, and wherein said projection is secured to the side of said connector bar and projects laterally therefrom.

References Cited by the Examiner
UNITED STATES PATENTS

| | | | |
|---|---|---|---|
| 1,577,347 | 3/26 | Neumann | 294—63 |
| 2,666,663 | 1/54 | McDonough | 294—67 X |
| 2,866,660 | 12/58 | McGuire | 294—63 |
| 2,985,481 | 5/61 | Janoff | 294—67 X |

SAMUEL F. COLEMAN, *Primary Examiner.*
ANDRES H. NIELSEN, *Examiner.*